April 14, 1970    M. M. BACKUS ET AL    3,506,955
MULTILINE SEISMIC EXPLORATION
Filed Oct. 26, 1967

INVENTORS
MILO M. BACKUS
WILLIAM A. SCHNEIDER

ATTORNEY

INVENTORS
MILO M. BACKUS
WILLIAM A. SCHNEIDER

ATTORNEY

United States Patent Office

3,506,955
Patented Apr. 14, 1970

3,506,955
MULTILINE SEISMIC EXPLORATION
Milo M. Backus and William A. Schneider, Dallas, Tex., assignors to Texas Instruments Incorporated, Dallas, Tex., a corporation of Delaware
Filed Oct. 26, 1967, Ser. No. 678,355
Int. Cl. G01v 1/13, 1/38
U.S. Cl. 340—7                                10 Claims

ABSTRACT OF THE DISCLOSURE

Discrete seismic signals are sequentially generated at spaced points along three parallel, spaced apart lines of traverse. Alternating ones of the discrete seismic signals are sequentially received along the middle line of traverse and are recorded. Additional lines of traverse are interleaved and intersected with the three lines of traverse in order to provide a grid coverage of a selected geologic area.

---

This invention relates to seismic exploration and more particularly to the use of a plurality of seismic signal generation units in order to provide concurrent multiline coverage of a selected geologic area.

It has heretofore been known to sequentially traverse a geologic area with a seismic explortaion system along a series of uniformly spaced parallel and perpendicular lines in order to obtain seismic information in grid form over the area. Such grid coverage exploration is usually accomplished with a single shooting unit and a single receiving unit which traverse one linear path at a time in an aligned relationship. As very close grid coverage is often desired in order to accurately determine the characteristics of such geologic formations as salt dome configurations, a large number of time consuming and expensive traverses have heretofore been required in the use of conventional seismic exploration systems. It would therefore be advantageous to provide a seismic exploration system whereby relatively complex grid coverage of an area may be accurately accomplished in a relatively short time, without an unnecessarily large financial expenditure.

In marine seismic exploration, it is the common practice to tow a streamer of hydrophones behind a recording vessel and to generate seismic impulses from a shooting vessel disposed some distance from the streamer. As previously discussed, a large number of traverses are required by such a two vessel system to provide accurate grid data for even a relatively small area. Further, the data obtained with the use of such a marine exploration system is sometimes inaccurate due to the fact that the geometry of the towed streamer is not precisely linear, but is rather curved by ocean currents and inaccurate navigation of the towing vessel. Without accurate determination of the geometry of the towed cable, precise indications of the geologic area being surveyed has heretofore been difficult to obtain.

In accordance with the present invention, successive seismic disturbances are sequentially generated along several spaced parallel lines of traverse. These seismic disturbances are successively received along a line of traverse between the parallel lines in order to provide a record of the geologic formation bounded by the parallel lines of traverse. In one embodiment of the invention, the geometry of a towed marine streamer is determined by measurement of the first arrivals of seismic disturbances generated from the parallel lines.

For a more complete understanding of the present invention and for further objects and advantages thereof, reference may now be had to the following description taken in conjunction with the accompanying drawings in which.

Figure 1:
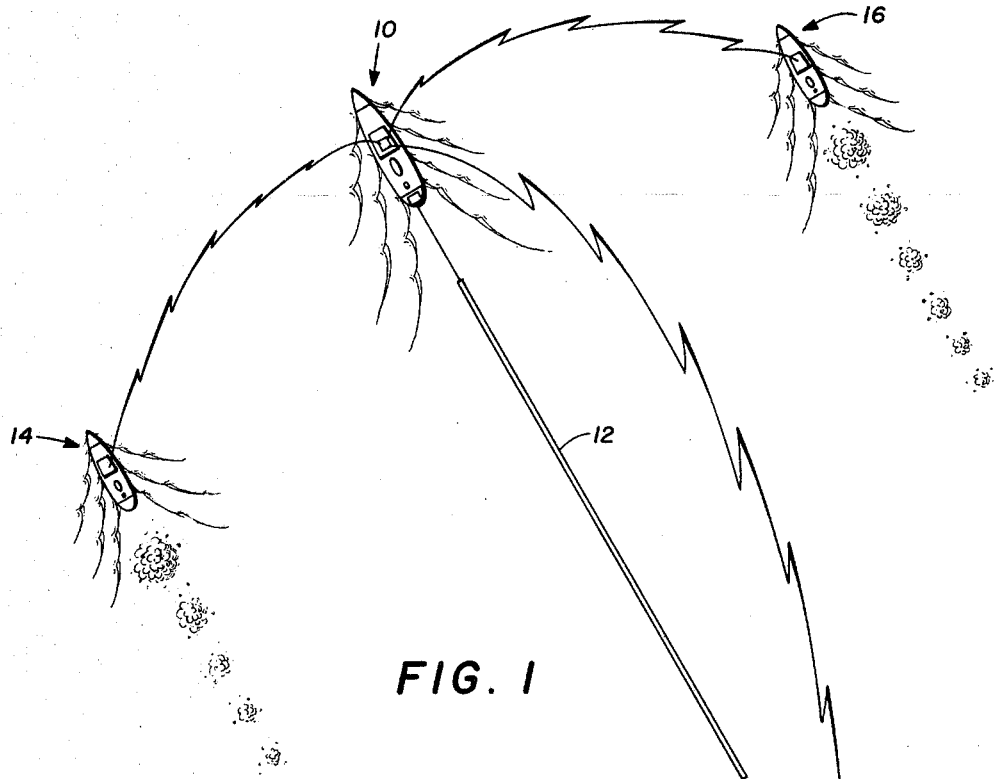
FIGURE 1 illustrates one embodiment of the invention.

Referring to FIGURE 1, a marine seismic exploration system for practice of the present invention is illustrated. A recording boat 10 tows in a conventional manner a streamer 12 which includes a plurality of spaced hydrophones for receiving seismic impulses. Three shooting boats 14, 16 and 18 maintain predetermined courses with respect to the recording boat 10 and sequentially generate seismic impulses which are successively received by the hydrophones in the streamer 12. The shooting boats 14 and 16 are each spaced from the line of traverse of the recording boat 10 by a considerable distance, such as two kilometers, and are spaced behind the recording boat 10 at a distance of about 1200 feet. By way of example, the streamer 12 is approximately 6900 feet long and is towed at a depth of about fifty feet below the surface. In such case, the third shooting boat 18 is spaced about 1200 feet from the end of the streamer 12 and maintains a course directly behind the recording vessel 10. It will of course be realized that the distances separating the vessels may be changed for the exploration of various areas having differing characteristics.

Shooting boats 14 and 16 traverse paths parallel to the path of the recording boat 10, while the shooting boat 18 traverses essentially the same path as the recording boat 10. Each of the boats carries its own navigation system, in addition to pre-plot information of the area, in order to accurately maintain the desired course. Therefore, it will be seen that three spaced apart parallel shooting paths are concurrently accomplished by the present method. Shooting boats 14, 16 and 18 generate discrete seismic impulses by any one of a number of conventional means, such as by dynamite explosions. In order that the streamer 12 may sequentially receive clear seismic signals originating from each of the shooting boats, the operation of the shooting boats must be precisely controlled so that the discrete seismic signals are nonsynchronously generated.

In one embodiment, radio control signals are dispersed to each of the shooting boats from a transmitter 19 located aboard the recording vessel 10. Receivers located aboard each of the shooting boats receive control signals and utilize the signals to control the sequence of generation of the discrete seismic signals. In an exemplary practice of the invention wherein all four boats are traveling at six knots, a fifty-pound dynamite charge is detonated behind each shooting boat every sixty seconds, with the shots from the boats being sequenced twenty seconds apart. In one cycle of operation of the system, boat 14 detonates a dynamite charge, boat 16 then detonates a dynamite charge after a first twenty second delay, boat 18 then detonates a dynamite charge after second twenty second delay, and boat 14 detonates another dynamite charge after a third twenty second delay.

The twenty second sequencing of the discrete seismic signals generated by the three boats 14, 16 and 18 allows a ten second buffer between shots for conventional ten second records taken aboard the recording vessel 10. When making recording traverses of sixteen kilometer lengths, about 270 ten second records will be required. These records will fill four conventional field tapes, necessitating several tape changes along each line of traverse. Such tape changes may be made without a halt in the recording procedure, as only two shots will not be recorded, allowing forty seconds for each tape change. The missing of these two shots during each sixteen kilometer traverse is not serious with regard to the accuracy of recording, since successive shots are associated with different subsurface lines.

If desired, indications of the exact positions of each of the vessels may be continuously recorded on separate records for later use in processing the data received by the recording vessel. Indications of the positions of the shooting vessels may also be continuously telemetered to the recording vessel 10 for simultaneous recording along with the data recorded by the recording vessel 10.

The present invention thus allows coverage of relatively wide areas in a rapid, yet inexpensive, manner. Furthermore, the obtaining of concurrent seismic data along three parallel lines of traverse provides a generally more accurate grid record of an area, due to the fact that the ships may assist one another in maintaining the desired parallel courses.

Figure 2:
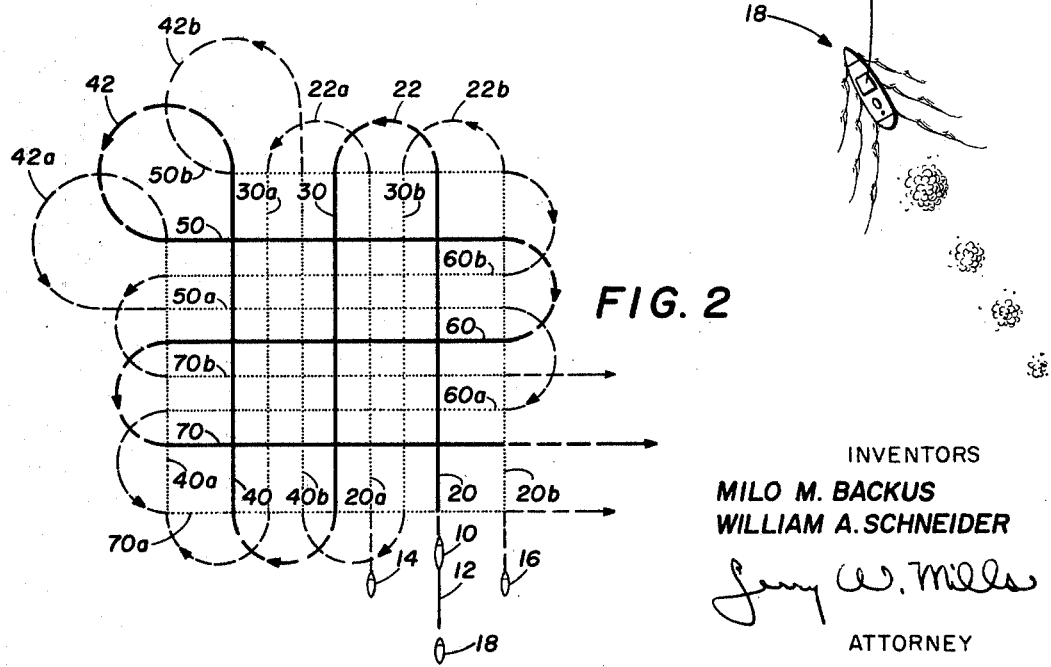
FIGURE 2 illustrates one type of grid coverage provided by the present invention.

The exploration system illustrated in FIGURE 1 may be advantageously utilized to provide a close grid record of a relatively small geologic area. Referring to FIGURE 2, a technique is illustrated whereby sixfold coverage of an area of ten square miles may be provided by six traverses according to the invention. A recording ship 10 is bounded by three shooting vessels 14, 16 and 18 in the configuration illustrated in FIGURE 1. The recording vessel 10 and the shooting vessel 18 initially travel along a line of traverse designated by the numeral 20. Shooting vessel 14 travels along a second parallel line of traverse 20a which is spaced apart from line 20 by approximately two kilometers. Similarly, shooting boat 16 travels along a line of traverse 20b also parallel to line 20 and spaced apart by approximately two kilometers.

The vessels maintain their predetermined spaced relationship throughout the length of the traverse by radio communication and by precise navigation. The three initial lines of traverse are continued for a predetermined distance dependent upon the size of the area to be explored, which may be for instance ten miles. At the end of the desired initial traverse, the three boats make 180 degree turns as shown by paths 22, 22a and 22b, and begin three different parallel lines of traverse designated as lines 30, 30a and 30b. Line 30b is interleaved between lines 20 and 20a.

At the completion of traverse lines 30, 30a and 30b, the ships execute 180 degree turns and begin a third set of traverses 40, 40a and 40b parallel to the prior traverses. The line of traverse 40b is interleaved between previously conducted lines of traverse 30 and 30a.

Upon the accomplishment of the third set of parallel traverses, the ships make 270 degree turns as shown by paths 42, 42a and 42b to initiate a fourth set of traverses shown as lines 50, 50a and 50b, each of which is perpendicular to the first three sets of traverses. After completion of the traverses 50, 50a and 50b, the ships make 180 degree turns and initiate another set of traverses 60, 60a and 60b. Finally, the ships each execute another 180 degree turn and travel along lines 70, 70a and 70b to complete the multiline coverage of the area. As may be clearly seen from an inspection of FIGURE 2, the completed coverage of the area according to the invention provides a uniform one kilometer grid coverage of the area, with a plurality of areas of overlapping coverage to provide accurate data for three dimensional processing.

Traverse lines 30 and 60 fill in the center of the grid and thus allow evaluation of various three dimensional schemes which uses only the perimeter data of lines 20, 50, 40 and 70 for interpolation of the interior grid lines. This interpolation may be checked against the actual data provided by lines 30 and 60.

Figure 3:
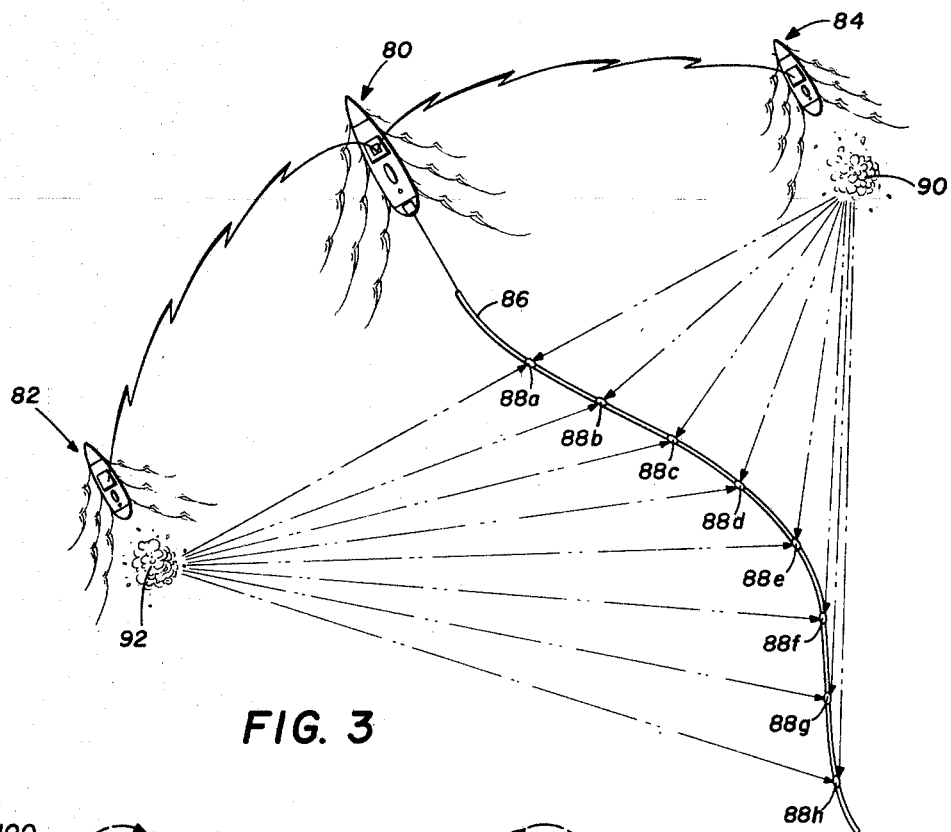
FIGURE 3 illustrates another embodiment of the invention.

It may be desirable in many instances to conduct the exploration illustrated in FIGURE 2 with only three vessels. FIGURE 3 illustrates the accomplishment of seismic exploration with a combined recording and shooting vessel 80, in conjunction with a pair of shooting boats 82 and 84. As vessel 80 performs the dual function of generating and recording discrete seismic signals, the fourth vessel illustrated in FIGURE 1 is not required. As in the previously disclosed embodiment, the seismic signals generated from the ships are staggered in time to allow each of the signals to be clearly received. Although the performance of the dual shooting and recording functions on one vessel requires circuitry to accurately synchronize the two functions, elimination of the fourth vessel provides a financial saving and eliminates some problems in coordination of the navigation of the vessels.

In addition to providing an effective method of obtaining grid data, the present invention also provides accurate indications of the geometry of the streamer towed by the recording boat. FIGURE 3 illustrates a streamer 86 towed by the recording boat 80 which includes a plurality of hydrophones 88a–88h spaced along the length thereof. In some instances, the streamer 86 will not be towed linearly behind the recording vessel 80, due to ocean currents or variances in the steering of the recording vessel. FIGURE 3 illustrates a rather severe curvature of the streamer 86, which undetected, could provide inaccurate indications of the subsurface area being explored.

However, with the maintenance of the two shooting boats 82 and 84 at the sides of the streamer 86, accurate indications of the geometry of the streamer may be continuously obtained. For instance, after the sequential generation of seismic signals at 90 and 92, direct arrival signals are received at each of the hydrophones 88a–h. If the streamer 86 is towed linearly behind the boat 80, the time intervals between the generation of signals at 90 and 92 and the reception of the direct arrival signals at each of the hydrophones will be generally equal.

However, due to the curvature of the streamer 86, shown in FIGURE 3, the time intervals required for the first arrival signals to reach hydrophones 88a–h from the seismic impulse 90 is substantially less than the time intervals required for the first arrival signals to arrive at the hydrophones from the seismic impulse 92. The relative magnitudes of the time intervals may be very accurately determined from recorded indications of the time of generation and reception of the first arrival signals. The position of each of the hydrophones 88a–h may then be computed from the magnitudes of the time intervals. Corrections may be introduced to the processed data to compensate for nonlinearities found in the geometry of the streamer 86.

It will be understood that, if desired, circuitry may be provided aboard the recording vessel 80 to automatically determine the geometry of the streamer 86 on a substantially real time basis. The continuously determined position of the streamer may then be sensed to automatically actuate various ballast controls on the streamer, in addition to controlling the speed and heading of the recording vesel, in order to maintain the streamer 86 in a desired linear position.

Figure 4:
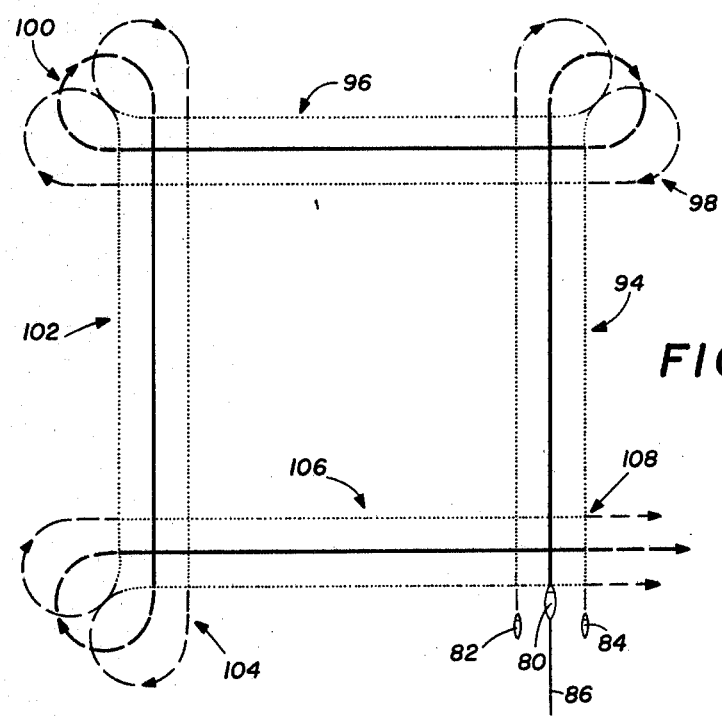
FIGURE 4 illustrates a relatively coarse multiline coverage provided by the invention.

While the exploration technique illustrated in FIGURE 2 is useful for accurately exploring relatively small areas, it is often desirable to rather quickly obtain a coarse indication of the overall geometric configuration of a large area. Utilizing this coarse information, a decision may be made as to whether or not it is desirable to further explore portions of the large area in greater detail. A suitable technique for such coarse exploration is illustrated in FIGURE 4 by utilizing a recording and shooting ship 80 centered between shooting boats 84 and 82 that previously described manner. If desired, a third shooting boat could be disposed directly behind the boat 80 as shown in FIGURE 1.

The exploration vessels traverse three parallel paths to provide a first set of traverses designated generally by the numeral 94. At the end of the set of traverses 94, the boats execute 270 degree loop turns and regroup to define a second set of traverses shown generally at 96. It will be noted that the paths of the vessels during the loop turns define a network of nine intersections within the rectangle designated as 98. These nine intersections provide accurate grid data which may be used for three dimensional interpretation purposes.

At the end of the set of traverses 96, similar 270 degree loop turns are executed by the boats to define a second set of nine traverse intersections shown generally at 100. The three boats then continue to define a third set of three traverses 102. A final 270 degree loop turn is performed by the vessels at 104 and the vessels then continue to define a fourth set of traverses 106 and a fourth network of nine traverse intersections at 108. After processing of the data accumulated during the coarse exploration shown in FIGURE 4, it may be determined whether or not to further investigate portions of the area coarsely sampled.

While the present invention has been disclosed specifically with respect to marine exploration, systems, it will be understood that the method could also be practiced in land exploration by utilizing mobile shooting and recording units to concurrently traverse three parallel paths.

Whereas the present invention has been disclosed with respect to several specific embodiments, it is to be understood that further modifications and changes may be suggested to one skilled in the art, and it is desired to encompass such changes and modifications in the appended claims.

What is claimed is:
1. A seismic exploration system comprising:
   (a) a plurality of mobile units concurrently movable along a like number of spaced apart parallel horizontal lines of traverse while being maintained at preselected intervals from one another,
   (b) means carried by ones of said units for periodically generating series of nonsynchronous discrete seismic signals along each of said lines of traverse, and
   (c) means carried by one of said mobile units for receiving alternating ones of said seismic signals from different lines of traverse.
2. The system of claim 1 wherein said means for receiving is movable along one of said lines of traverse.
3. The system of claim 1 wherein there are three mobile units movable along three parallel lines of traverse.
4. The system of claim 3 wherein said mobile units are self-propelled marine vessels, one of said vessels towing a streamer for receiving said seismic signals.
5. The system of claim 4 and further comprising a fourth marine vessel movable along one of said lines of traverse behind said streamer.
6. The method of seismic exploration comprising:
   (a) concurrently traversing a plurality of spaced apart generally parallel horizontal lines with seismic disturbance generators and receivers maintained at preselected intervals from one another,
   (b) sequentially generating along ones of said parallel lines successive nonsynchronous seismic disturbances,
   (c) successively receiving along one of said lines seismic reflections emanating from alternating ones of said parallel lines due to said nonsynchronous seismic disturbances, and
   (d) recording representations of said seismic reflections to provide a record of geological formations bounded by said parallel lines.
7. The method of claim 6 and further comprising:
sequentially generating and alternating receiving other seismic disturbances along a plurality of different traverse lines at least one of which is interleavingly disposed between said plurality of generally parallel lines.
8. The method of claim 7 and further comprising:
sequentially generating other seismic disturbances along a pluraltiy of other transverse lines normal to said plurality of generally parallel lines, and
receiving and recording reflections from said disturbances to form a gird record of geological formations between said traverse lines.
9. The method of claim 6 and further comprising:
generating and receiving other seismic disturbances along the bounds of a rectangular area to perform coarse seismic exploration of the rectangular area.
10. The method of marine seismic exploration comprising:
   (a) concurrently moving at least three marine vessels at the same speed along spaced apart parallel lines of traverse extending in one direction,
   (b) sequentially generating three series of non-synchronous seismic signals along said lines of traverse,
   (c) receiving at one of said vessels alternating ones of said seismic signals,
   (d) concurrently moving said vessels along additional sets of spaced apart parallel lines of traverse extending parallel and normal to said one direction while sequentially generating and receiving additional series of nonsynchronous seismic signals, and
   (e) recording each of said seismic signals to provide grid coverage of geological formations bounded by said lines of traverse.

References Cited

UNITED STATES PATENTS

| | | | |
|---|---|---|---|
| 3,327,287 | 6/1967 | Ball et al. | 340—15.5 |
| 3,368,191 | 2/1968 | McDonal | 340—15.5 |
| 3,331,050 | 7/1967 | Kilmer et al. | 340—7 |
| 3,414,874 | 12/1968 | McLoad | 340—7 |

RICHARD A. FARLEY, Primary Examiner

C. E. WANDS, Assistant Examiner

U.S. Cl. X.R.

340—15.5